US012763631B2

(12) United States Patent
Passos et al.

(10) Patent No.: US 12,763,631 B2
(45) Date of Patent: Oct. 13, 2026

(54) SINGLE-PIECE CASING FOR ROTATING ELECTRIC MACHINES AND CORRESPONDING ROTATING ELECTRIC MACHINE

(71) Applicant: WEG EQUIPAMENTOS ELÉTRICOS S.A., Jaraguá Do Sul (BR)

(72) Inventors: Alex Sandro Barbosa Passos, Jaragua do Sul (BR); Gustavo Felipe, Jaragua do Sul (BR); Eduardo Antonio Ribeiro, Guaramirim (BR)

(73) Assignee: WEG EQUIPAMENTOS ELÉTRICOS S.A. (BR)

( * ) Notice: Subject to any disclaimer, the term of this patent is extended or adjusted under 35 U.S.C. 154(b) by 133 days.

(21) Appl. No.: 18/522,523

(22) Filed: Nov. 29, 2023

(65) Prior Publication Data

US 2025/0132630 A1 Apr. 24, 2025

(51) Int. Cl.
*H02K 5/20* (2006.01)
*H02K 5/22* (2006.01)

(52) U.S. Cl.
CPC ................. *H02K 5/20* (2013.01); *H02K 5/22* (2013.01)

(58) Field of Classification Search
CPC .. H02K 5/20; H02K 5/22; H02K 9/19; H02K 5/203; H02K 5/06
See application file for complete search history.

(56) References Cited

U.S. PATENT DOCUMENTS

2010/0085706 A1* 4/2010 Savant .................. H02K 5/203 361/689
2020/0036264 A1* 1/2020 Lin ....................... H02K 11/33
2020/0161938 A1* 5/2020 Fatemi .................. H02K 9/197

FOREIGN PATENT DOCUMENTS

JP 2017118668 A * 6/2017 ............ H02K 5/203

OTHER PUBLICATIONS

Machine Translation of JP 2017118668 A (Year: 2026).*

* cited by examiner

*Primary Examiner* — Christopher M Koehler
*Assistant Examiner* — Riley Owen Stout
(74) *Attorney, Agent, or Firm* — McCarter & English, LLP

(57) ABSTRACT

The present invention relates to a single-piece casing for rotating electric machines. The casing includes at least one internal cooling coil, at least one inspection window including a through-opening, and at least one inspection cap. The single-piece casing and the internal cooling coil are formed in a single piece and protrusions of the inspection cap continue with the turns of the internal cooling coil in the region of the through-opening. The present invention further relates to a rotating electric machine.

11 Claims, 3 Drawing Sheets

SINGLE-PIECE CASING FOR ROTATING ELECTRIC MACHINES AND CORRESPONDING ROTATING ELECTRIC MACHINE

CROSS-REFERENCE TO RELATED APPLICATIONS

This application claims the benefit of Brazilian Patent Application No. BR 102023021636-6, filed on Oct. 18, 2023, which is incorporated herein in its entirety by reference.

FIELD OF APPLICATION

The present invention pertains to the field of rotating electric machines, in particular casings for rotating electric machines comprising cooling coils for circulating cooling fluids.

BACKGROUND OF THE INVENTION

Rotating electric machines are equipment used for transforming electric energy into mechanical energy, in the case of motors, and for transforming mechanical energy into electric energy, in the case of generators. Basically, they consist of four basic structures, which are stator, rotor, bearings/caps, and casing, in addition to other components and accessories needed for their operation such as cooling systems, one or more connection boxes and the like.

The stator is the static active (energized) component responsible for transmitting the magnetic flux for rotating the rotor, in the case of motors, and for transmitting the energy generated by the rotor, in the case of generators, whereas the rotor is the active (energized) component of the rotating electric machine.

The rotor, in turn, is basically composed of a shaft onto which one or more cages, coils, or permanent magnets are arranged, depending on the construction type and operating principle of the rotating electric machine.

The bearings are the elements responsible for coupling the rotating parts to the static parts of a rotating electric machine, performing, for example, the coupling, bearing, and centralization of the (rotating) rotor in relation to the (static) stator, allowing relative movement between rotor and stator, as well as the transmission of forces therebetween, whilst the caps generally close the electric machine ends.

The casing is a static element, generally cast in metal, responsible for integrating the structures of the rotating electric machine, which can also perform additional functions such as promoting cooling through, for example, turn-shaped channels or cooling coils through the which a fluid is pumped to help in the removal of heat generated during the operation of the electric machine. The use of cooling coils significantly complement or even replaces the heat exchange carried out by the usual auxiliary air cooling or ventilation systems (self-ventilation with fans or forced ventilation by external elements) when the latter are insufficient or cannot be used.

Give that rotating electric machines operate under a myriad of conditions of rotation, mechanical load, temperature, and environments, they need an efficient, effective, and reliable heat exchange. In this context, cooling coils are a viable and effective alternative to ensure the removal of heat in electric machines subjected to intense operating regimes and which are often installed in closed or poorly ventilated compartments.

In the known state of the art, the casings of electric machines of the nature discussed here are normally constructed in two or even more pieces, so as to facilitate the removal of casing segments from the molding box and, when comprising internal cooling coils, to enable the collapse of the internal core of the cooling coil model and thus facilitate the removal of sand or salt from inside the obtained final piece.

The use of bipartite molds, however, requires a series of different process steps, starting with the casting of two pieces, machining the interfaces therebetween and the mold parting lines, pressing and fixing the two pieces in order to ensure impermeability, in addition to final machining to ensure the finish.

In order to avoid this substantial number of processes to obtain the final casing, an alternative is producing it in a single piece. However, in the single piece concept, there is the challenge of completely removing sand from the central core which will form the channels inside the piece, given that, for this cleaning and sand removal to be effective, it is necessary to add openings or windows large enough for all this material to be removed from the inside of the casing. When adding said windows, interruptions and discontinuities are accrued in the cooling coil channels, impairing the cooling system's performance and making its application unfeasible in cases which require greater power density.

The challenge lies therefore in designing a casing cast in a single body, equipped with one or more inspection caps constructed and positioned so as to ensure integrity and impermeability of the cooling coil in the inspection window regions, and that are, at the same time, of simple construction and manufacturing, with optimization of both the use of raw materials and the manufacturing and assembly process. Furthermore, the challenge lies in ensuring that the inspection caps are assembled so that the final piece is free from interruptions and misalignments in the water channels which harm the piece's thermal performance.

STATE OF THE ART

There are, in the state of the art, several solutions intended for the circulation of cooling fluids through the casings of rotating electric machines.

One such example is patent document EP859447 which discloses and describes a liquid-cooled electric motor casing, which contains a cooling coil cast into the casing, in which the cooling coil is arranged in a helical configuration and the stator casing is molded around the cooling coil, in which the cooling coil is embedded inside and integrally with the casing. Spacer or stabilizer bars are engaged with the cooling coil, provide support for the cooling coil, and facilitate maintenance of the desired spacing between cooling coil lengths and between the cooling coil and the casing wall.

The solution suggested by EP859447 describes the standard process of casting a cooling coil into the casing itself using sand molds.

Therefore, this solution has the problems already known in the prior art and does not disclose or describe any type of inspection window cap with channels compatible with the casing cooling coil, or even an inspection window cap which allows for the addition of a seal in the bottom of the cooling coil to reduce unwanted passage of cooling fluid flow.

Another example is patent document JP2012253874 which discloses and describes a coolant passage structure of a rotating electric machine which includes: a cylindrical internal cylinder; an external pipe having a U-shaped cross-section and arranged so that a lower half thereof forms a predetermined gap between it and the internal pipe; a front side plate and a rear side plate respectively arranged on both the end parts of the internal pipe and the external pipe; a cap covering an opening of the external barrel for opening and closing; and an arc-shaped junction box attached to a lower surface of the cap and arranged so as to form predetermined gap between it and the internal cylinder.

The solution suggested by JP2012253874 describes an upper opening for maintaining the motor's cooling channel with a cap, in which the cap completely seals its cooling channels, preventing liquid from leaking between adjacent channels.

However, the cap provided by said solution has a smooth geometry, not following the geometry of the channels, in addition to being attached to the casing by means of screw, not providing any type of recess for the addition of a seal or for welding.

Furthermore, said solution also does not address the alignment problem (radial and axial height) between the casing and window cooling coil.

As can be inferred from the above description, there is space and demand for a solution for casings of rotating electric machine comprising cooling coils for cooling fluid circulation that comprise caps for inspection windows with channels compatible with the casing cooling coil, which allow for better thermal exchange and better cooling fluid flow, while allowing windows and caps to have recesses for adding sealing or welding recesses that reduce the unwanted passage of cooling fluid flow. There is also demand for a solution which uses a window cap geometry which ensures alignment (radial and axial height) between the casing and window cooling coils and which is, at the same time, simple in construction and manufacturing, optimizing both the use of raw material and the manufacturing and assembly process in relation to its peers in the relevant state of the art.

OBJECTS OF THE INVENTION

Therefore, one of the objects of the present invention is providing a single-piece casing for rotating electric machines according to the features of claim 1 of the appended set of claims.

Another object of the present invention is to provide a rotating electric machine.

Additional features and details thereof are presented in the dependent claims.

BRIEF DESCRIPTION OF THE DRAWINGS

For a better understanding and visualization of the object to which the invention relates, it will now be described with reference to the accompanying figures, representing the obtained technical effect by means of an exemplary embodiment without limiting the scope of the present invention, in which, schematically.

DETAILED DESCRIPTION OF THE INVENTION

Figure 1:
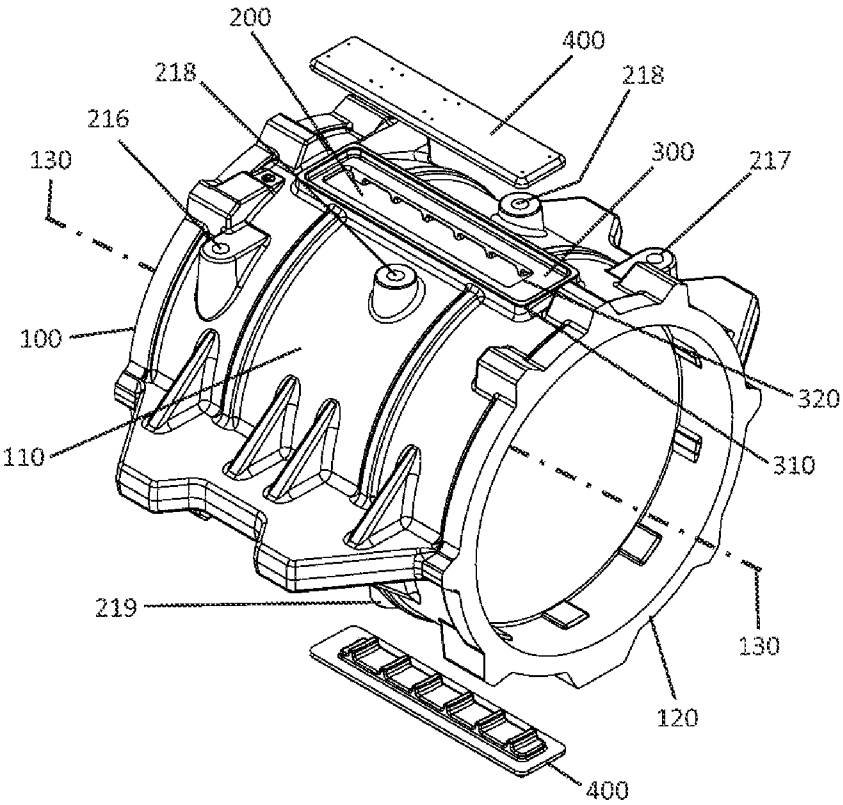
FIG. 1 shows an exploded perspective view of a single-piece casing according to the invention.
Figure 1A:
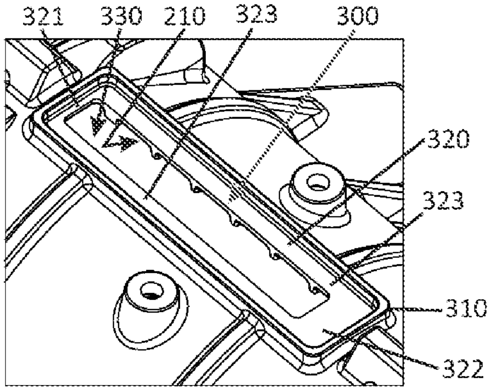
FIG. 1*a* shows an enlarged partial view of the inspection opening in FIG. 1.
Figure 2:
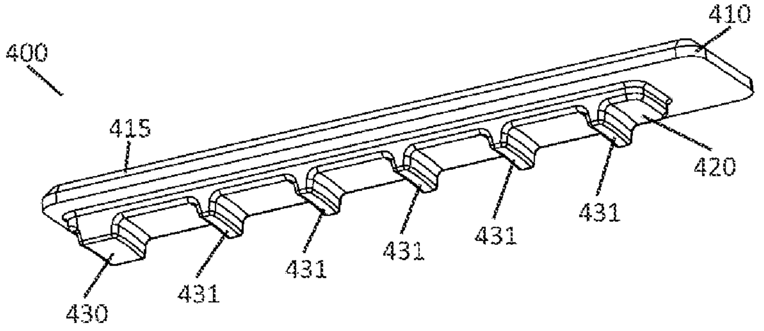
FIG. 2 shows a perspective view of an inspection cap according to the invention.
Figure 3:
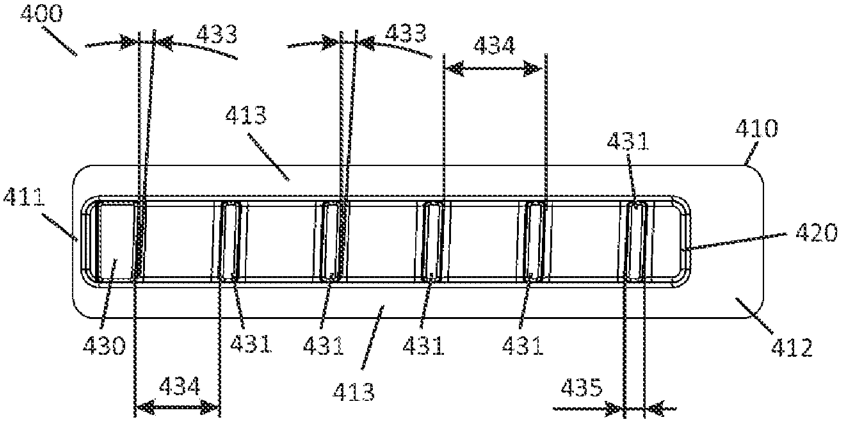
FIG. 3 shows a bottom view of the inspection cap in FIG. 2.
Figure 4:
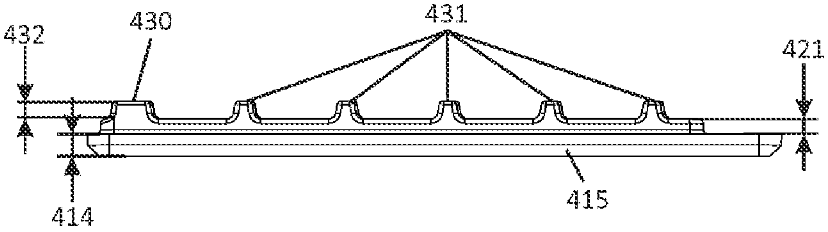
FIG. 4 shows a side view of the inspection cap in FIG. 2.
Figure 5:
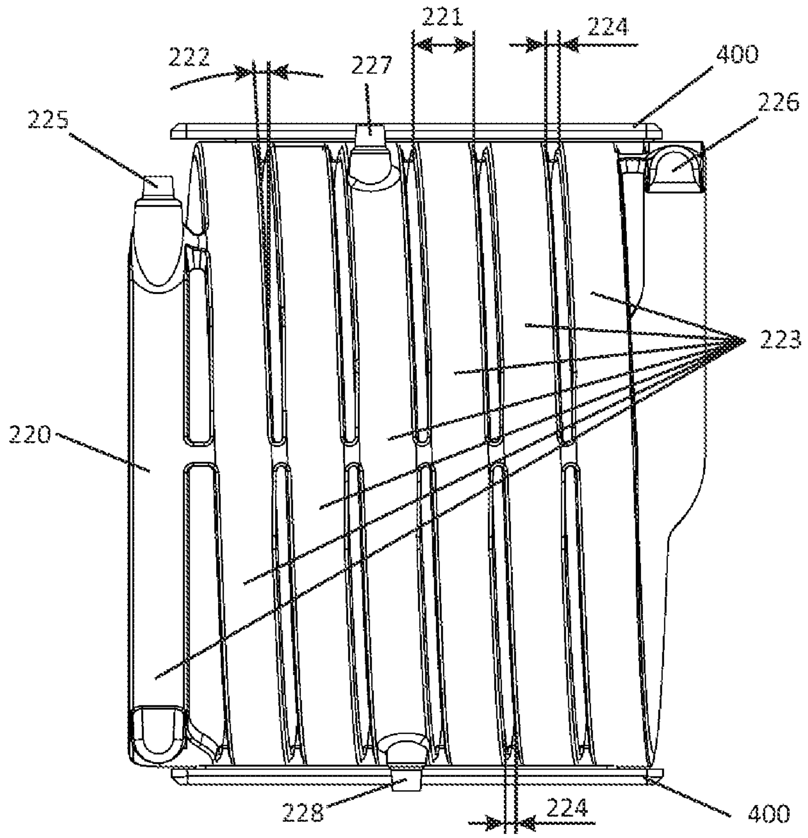
FIG. 5 shows a schematic side view of a casting model of the cooling coil in FIG. 1 and the positioning of the inspection caps according to the invention.
Figure 6:
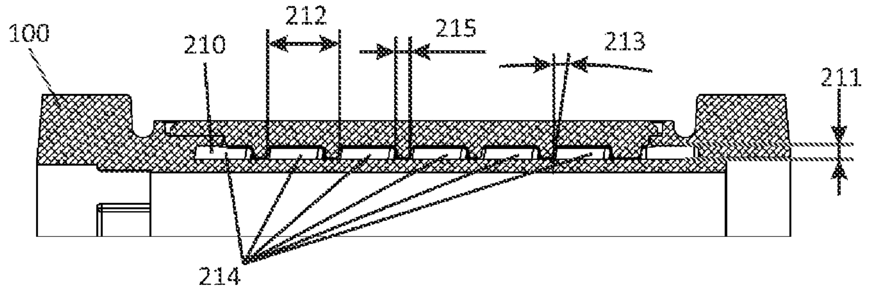
FIG. 6 shows a partial sectional view of the casing according to the invention, highlighting the positioning of the inspection cap in relation to the cooling coil channels.

The present invention relates to a single-piece casing (100) for a rotating electric machine, comprising at least one internal cooling coil (200), at least one inspection window (300), and at least one inspection cap (400).

In the context of the present invention, the term "single-piece" broadly refers to a casing manufactured in a single body, preferably, but without limiting the invention, in molds with models and sand cores, which may be the chosen process, without limiting the invention, from the group that includes pour casting, shell casting, injection casting, and other processes suitable for the desired design features and manufacturing volume.

In the context of the present invention, the term "cooling coil" broadly refers to a fluid conduction structure equipped with turn-shaped channels and embedded in the casing of a rotating electric machine.

The single-piece casing (100) is constructed preferably, but without limiting the invention, in a tubular cylindrical shape, comprising a cylindrical main body (110) with a wall (120), being preferably, but without limiting the invention, manufactured in iron and/or aluminum by sand casting.

The internal cooling coil (200) comprises a channel (210) of any shape, but preferably, and without limiting the present invention, helical with a channel height (211), pitch (212), helix angle (213), and turns (214) with a inter-turn distance (215) extending from a cooling coil inlet (216) to a cooling coil outlet (217), both formed on the external surface of the cylindrical main body (110), wherein the internal cooling coil (200) runs, in axial direction, across the entire wall (120) of the single-piece casing (100), with the internal cooling coil (200) formed by a sand core (220), arranged in a molding box or mold (not shown), and onto which the molten metal is poured for casting the single-piece casing (100).

The sand core (220) is a solid body of preferably, but without limiting the invention, helical shape around which the single-piece casing (100) is molded, comprising a pitch (221), helix angle (222), turns (223), and inter-turn distance (224), comprising at least one cooling coil inlet protrusion (225), at least one cooling coil outlet protrusion (226), in addition to one or more upper fixing protrusions (227) and one or more lower fixing protrusions (228). The fixing protrusions (227, 228) serve to anchor the sand core (220) inside the modeling box or mold, being solid so as not to compromise the sealing of the channel (210). The upper fixing protrusions (227) and lower fixing protrusions (228) respectively form, on the external surface of the cylindrical main body (110), upper external protrusions (218) and lower external protrusions (219).

The at least one inspection window (300) is a through polygonal opening arranged on the external surface of the cylindrical main body (110), with the function of allowing the extraction of sand from the sand core (220) after shaping the single-piece casing (100).

It should be noted that there may be more than one inspection window (300), without limitation as to their distribution in the single-piece casing (100) nor as to their relative arrangement among themselves.

Each of the inspection windows (300) comprises an upper edge (310), a recess (320) preferably, but without limiting the invention, with a flat surface parallel to the horizontal plane of the longitudinal axis (130) of the single-piece casing (100), and a through-opening (330), wherein the flat surface of the recess (320) comprises a short smaller face (321), a long smaller face (322), and two narrow major faces (323). Alternatively, the configuration of the inspection windows (300) may vary depending on the need to apply the present invention. In a non-limiting example of the present invention, all faces (321, 322, 323) may have the same length.

It should be noted that, preferably, but not limitingly, the through-opening (330) may have a polygonal shape.

The inspection caps (400) are polygonal caps shaped and sized corresponding to both the shape and sizing of the inspection windows (300) and the turns (214) of the channel (210).

Each inspection cap (400) comprises a base platform (410), optionally, but without limiting the invention, an intermediate platform (420) and a plurality of protrusions (430, 431) extending from the intermediate platform (420), wherein the surface of the base platform (410) surrounding the intermediate platform (420) forms a flat face comprising a short smaller face (411), a long smaller face (412) and two narrow major faces (413), wherein the base platform (410) comprises a base height (414) and optionally a perimeter chamfer (415). Alternatively, the configuration of the inspection caps (400) may vary depending on the need to apply the present invention. In a non-limiting example of the present invention, all faces (411, 412, 413) may have the same length.

It should be noted that the inspection cap (400) preferably, but without limiting the invention, is formed as a single body piece, however, the inspection cap (400) could be formed in a form segmented without prejudice to the invention.

If the inspection cap (400) is formed in a segmented manner, the base platform (410) and/or the intermediate platform (420) and/or the plurality of protrusions (430, 431) will be separately arranged so as to be then joined by a suitable fixing element.

Said inspection cap (400) is preferably, but without limiting the invention, manufactured from polymeric materials, composites and/or any fusible metal alloy. Even more preferably, the inspection cap (400) is manufactured from the same material as the single-piece casing (100).

The intermediate platform (420) comprises an intermediate height (421), at least one larger protrusion (430) and a plurality of smaller protrusions (431), wherein all protrusions (430, 431) preferably, but not limited to the invention, extend perpendicularly from the surface of the intermediate platform (420), and have protrusion height (432). The larger protrusion (430) is arranged flush with the short smaller face (411) and its face opposite the short smaller face (411) comprises a protrusion inclination (433). The smaller protrusions (431) also have the protrusion inclination (433) but on both of their larger faces, with the smaller protrusions (431) being therefore parallel to each other and parallel to the inclined face of the larger protrusion (430). The distance (434) between the first smaller protrusion (431) and the larger protrusion (430) is equal to the distance (434) between each of the smaller protrusions (431) and preferably equal to the pitch (212) of the channel (210). Therefore, the thickness (435) of the smaller protrusions (431) is equal to or slightly less than the inter-turn distance (215) of the turns (214) of the channel (210). It should be noted that, depending on the project, without limiting the invention, there may be only one type of protrusion or an alternation of protrusions with different dimensions. Alternatively, the configuration of the protrusions (430, 431) may vary depending on the need to apply the present invention. In a non-limiting example of the present invention, all protrusions (430, 431) may have the same thickness.

Preferably, both the base height (414) and the upper edge (310) have the same value.

For the present invention to function optimally, the protrusion height (432) must preferably be equal to the channel height (211), so that together they form a continuous channel inside the single-piece casing (100).

The perimeter chamfer (415) is an optional inclination which may be arranged around the entire base platform (410) and can optimize the process of eventual welding and/or sealing between the inspection cap (400) and the inspection window (300). Preferably, the perimeter chamfer (415) forms, together with the upper edge (310), a "half-V chamfer" shaped chamfer around the entire base platform (410).

It should be noted that the base platform (410) is shaped and sized corresponding to the shape and sizing of the upper edge (310). Preferably, the base platform (410) is shaped compatible with or preferably identical to the shape of the upper edge (310).

It should be noted that the short smaller face (321), the long smaller face (322), and the narrow major faces (323) delimit the sizing, i.e., width and length of the upper edge (310), whilst the short smaller face (411), the long smaller face (412), and the narrow larger faces (413) delimit the sizing of the base platform (410), in which the sizing of the upper edge (310) may be greater than or equal to the sizing of the base platform (410), preferably the sizing of the upper edge (310) is greater than the sizing of the base platform (410), so as to form a clearance between the base platform (410) and the inspection window (300) and facilitate its assembly.

The intermediate platform (420) is shaped and sized corresponding with the through-opening (330). Preferably, the intermediate platform (420) is shaped and sized, i.e., has width and length compatible with the shape and sizing of the through-opening (330), so as to form a gap-free fit between the inspection cap (400) and the inspection window (300).

Similarly, the protrusions (430, 431) are shaped and sized corresponding with the through-opening (330). Preferably, the protrusions (430, 431) are shaped and sized, i.e., have width and length, similar to the shape of the through-opening (330), so as to form a gap-free course for the internal cooling coil (200).

Preferably, the base platform (410) does not come into contact with the cooling fluid, given that, when the inspection window (300) and inspection cap (400) are sealed, the cooling fluid will move through the internal cooling coil (200) without losses and without leaking through the through-opening (330).

Therefore, the inspection caps (400) are fitted and subsequently fixed to the inspection windows (300) at the same time as they act as a continuation of the turns (214) of the internal cooling coil (200), ensuring flow continuity without interruptions, deviations, or leaks, especially in the region of the through-opening (330). Thus, by closing the inspection caps (400) on the inspection windows (300), the present invention can provide a continuous internal cooling coil (200), which provides a better cooling fluid flow to the rotating electric machine, forming a continuous course of cooling fluid along the entire internal cooling coil (200).

Preferably, the inspection caps (400) are fixed to the inspection windows (300) by welding, liquid or non-liquid joints, or screwing to the casing, wherein the aforementioned sizing relationships and in particular the perimeter chamfer (415) provide a versatile and flexible interface.

It should be noted that the features of the inspection cap (400) should preferably match the features of the internal cooling coil (200). As such, common changes to the internal cooling coil (200) and inspection cap (400) are permitted, e.g., different distances (434) from each other, lack of protrusion inclinations (433), lack of the largest protrusion (430), among others, without departing from the scope of protection of the present application.

As such, the present invention is capable of teaching about a single-piece casing (100) which, in addition to comprising an inspection window (300) and an inspection cap (400) having protrusions (430, 431) with geometries corresponding to the internal cooling coil (200), is also capable of ensuring alignment (radial and axial height) between the internal cooling coil (200) and the protrusions (430, 431), forming a single internal cooling coil (200) continuous throughout the entire single-piece casing (100), allowing a better cooling fluid flow and consequently better thermal exchange between the single-piece casing (100) and the cooling fluid.

It should be noted that the terms "corresponding", "correspond" and other variants, according to the present invention, refer to a compatibility relationship between two or more elements, so that they can all interact with each other without requiring any alteration and/or adaptation therebetween and mainly so that all elements can function without malfunctions and/or problems and/or damages to any element of the invention.

In addition, the inspection windows (300) and inspection caps (400) have recesses for adding sealing or welding recesses, ensuring that the inspection window (300) and inspection cap (400) are reliably sealed and eliminating any unwanted passage and/or loss of energy from the cooling fluid flow.

Furthermore, the present invention ensures a simple solution compared to the state of the art, allowing for the formation of casings with cooling coils in a single piece through the casting method using sand molds.

CONCLUSION

It will be easily understood by one skilled in the art that modifications may be made to the present invention without departing from the concepts set out in the description above. Such modifications should be considered as included within the scope of the present invention. Consequently, the particular embodiments previously described in detail are illustrative and exemplary only and are non-restrictive as to the scope of the present invention, which should be given the full extent of the appended claims and any and all equivalents thereof.

The invention claimed is:

1. A casing for rotating electric machines, comprising:
at least one internal cooling coil,
at least one inspection window comprising a through-opening, and
at least one inspection cap,
wherein the casing and the internal cooling coil are formed in a single piece,
wherein protrusions of the inspection cap continue with turns of the internal cooling coil in a region of the through-opening,
wherein the inspection cap comprises a base platform, an intermediate platform, and a plurality of protrusions extending from the intermediate platform, including a larger protrusion and a plurality of smaller protrusions, and
wherein the larger protrusion is arranged flush with the short smaller face and its face opposite the short smaller face comprises a protrusion inclination.

2. The casing for rotating electric machines according to claim 1, wherein the internal cooling coil comprises turns with an inter-turn distance, and extends from a cooling coil inlet to a cooling coil outlet, both formed on the external surface part of the cylindrical main body, wherein the internal cooling coil runs in an axial direction across the entire wall of the casing.

3. The casing for rotating electric machines according to claim 1, wherein a flat surface of the base platform surrounds the intermediate platform and forms a flat face comprising a short smaller face, a long smaller face, and two narrow larger faces, wherein the base platform comprises a base height and a perimeter chamfer.

4. The casing for rotating electric machines according to claim 1, wherein the intermediate platform comprises an intermediate height, wherein all protrusions extend perpendicularly from the flat surface of the intermediate platform and have protrusion height.

5. The casing for rotating electric machines according to claim 1, wherein the smaller protrusions have the protrusion inclination.

6. The casing for rotating electric machines according to claim 1, wherein a distance between a first one of the plurality of smaller protrusion and the larger protrusion is equal to the distance between each of the smaller protrusions.

7. The casing for rotating electric machines according to claim 1, wherein the distance is equal to the pitch of the channel, and wherein the smaller protrusions have a thickness equal to or smaller than the inter-turn distance of the channel.

8. The casing for rotating electric machines according to claim 1, wherein the base platform is shaped compatible with the shape of an upper edge of the inspection window, and wherein the sizing of the upper edge is greater than or equal to the sizing of the base platform.

9. The casing for rotating electric machines according to claim 1, wherein the intermediate platform is shaped and sized compatible with the shape of the through-opening.

10. The casing for rotating electric machines according to claim 1, wherein the inspection window comprises an upper edge, a recess with a flat surface parallel to the horizontal plane of the longitudinal axis of the casing and a through-opening, wherein the flat surface of the recess comprises a short smaller face, a long smaller face, and two narrow major faces.

11. A rotating electric machine, comprising:
a casing of claim 1, and
a cooling fluid.

* * * * *